United States Patent
Palaniappan et al.

(10) Patent No.: US 10,869,184 B2
(45) Date of Patent: Dec. 15, 2020

(54) METHOD AND SYSTEM FOR DETECTING EDGE SERVER IN MOBILE TELECOMMUNICATION NETWORK

(71) Applicant: Samsung Electronics Co., Ltd., Gyeonggi-do (KR)

(72) Inventors: Ramanathan Palaniappan, Bangalore (IN); Songyean Cho, Gyeonggi-do (KR); Vijay Kumar Mishra, Bangalore (IN); Jinhyoung Kim, Gyeonggi-do (KR); Sojeong Park, Gyeonggi-do (KR); Sungjin Park, Gyeonggi-do (KR); Samrat Karmbir Singh, Bangalore (IN); Siddhant Jaiswal, Bangalore (IN); Prakash Rao, Bangalore (IN); Mini Agrawal, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/594,975

(22) Filed: Oct. 7, 2019

(65) Prior Publication Data

US 2020/0112848 A1    Apr. 9, 2020

(30) Foreign Application Priority Data

Oct. 5, 2018   (IN) .................. 201841037842 PS
Oct. 4, 2019   (IN) .................. 201841037842 CS

(51) Int. Cl.
*H04L 29/12*      (2006.01)
*H04W 8/06*       (2009.01)
(Continued)

(52) U.S. Cl.
CPC ........... *H04W 8/06* (2013.01); *H04L 61/1511* (2013.01); *H04W 8/08* (2013.01); *H04W 8/18* (2013.01);
(Continued)

(58) Field of Classification Search
CPC ....... H04W 8/06; H04W 60/00; H04W 76/16; H04W 48/18; H04W 8/08; H04W 76/11; H04W 8/18; H04W 76/12; H04L 61/1511
See application file for complete search history.

(56) References Cited

U.S. PATENT DOCUMENTS

2017/0339101 A1*  11/2017  Suga ................... H04L 61/2076
2017/0359843 A1*  12/2017  Bell .................. H04W 12/0602
(Continued)

OTHER PUBLICATIONS

Bhardwaj, Ketan et al., AppFlux: Taming App Delivery via Streaming, Usenix Conference on Timely Results in Operating Systems 2015 (TRIOS '15), 14 pages.
(Continued)

*Primary Examiner* — Joseph E Dean, Jr.
(74) *Attorney, Agent, or Firm* — The Farrell Law Firm, P.C.

(57) ABSTRACT

The present disclosure relates to a communication method and system for converging a 5th-Generation communication system for supporting higher data rates beyond a 4th-Generation system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure describes a method and a system for detecting Enhanced Data rates for edge server in a mobile telecommunication network by a mobile terminal.

16 Claims, 10 Drawing Sheets

(51) Int. Cl.
*H04W 60/00* (2009.01)
*H04W 76/16* (2018.01)
*H04W 48/18* (2009.01)
*H04W 8/08* (2009.01)
*H04W 76/11* (2018.01)
*H04W 8/18* (2009.01)

(52) U.S. Cl.
CPC ........... *H04W 48/18* (2013.01); *H04W 60/00* (2013.01); *H04W 76/11* (2018.02); *H04W 76/16* (2018.02)

(56) References Cited

U.S. PATENT DOCUMENTS

| | | | |
|---|---|---|---|
| 2018/0227743 A1* | 8/2018 | Faccin | H04W 48/17 |
| 2018/0270720 A1 | 9/2018 | Shi et al. | |
| 2018/0349203 A1* | 12/2018 | Ohta | G06F 9/45558 |
| 2018/0352051 A1 | 12/2018 | Tsai et al. | |

OTHER PUBLICATIONS

Young-il Choi et al., "Support for Edge Computing in the 5G Network", Tenth International Conference on Ubiquitous and Future Networks, ICUFN 2018, Aug. 16, 2018, 5 pages.

Sami Kekki et al., "MEC in 5G Networks", ETSI White Paper No. 28, Jun. 2018, 28 pages.

Fabio Giust et al., "MEC Deployments in 4G and Evolution Towards 5G", ETSI White Paper No. 24, Feb. 2018, 24 pages.

3GPP, 3rd Generation Partnership Project; Technical Specification Group Services and System Aspects; System Architecture for the 5G System; Stage 2 (Release 15).

3GPP TS 23.501 V15.3.0, Sep. 17, 2018, 226 pages.

International Search Report dated Jan. 16, 2020 issued in counterpart application No. PCT/KR2019/013142, 7 pages.

* cited by examiner

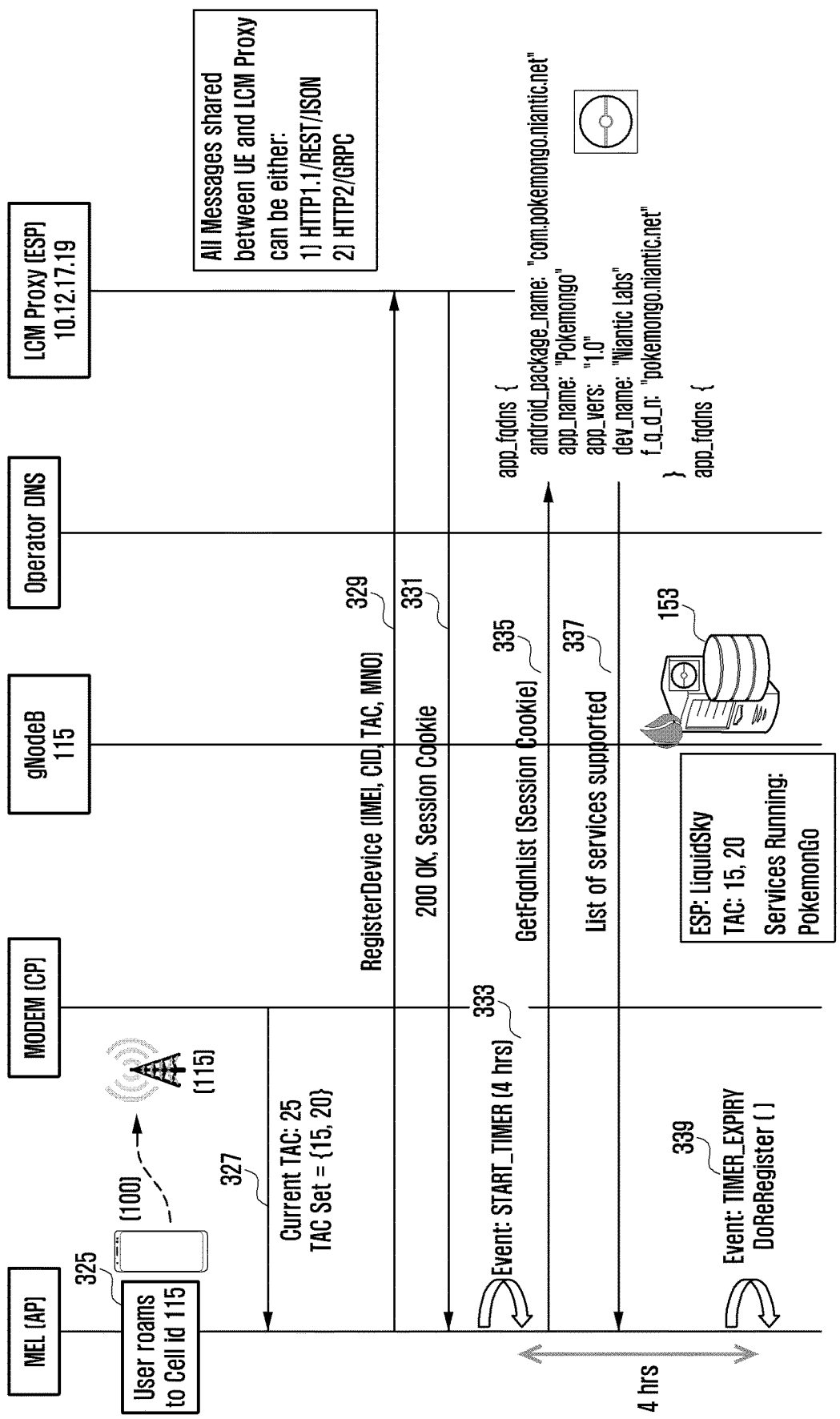

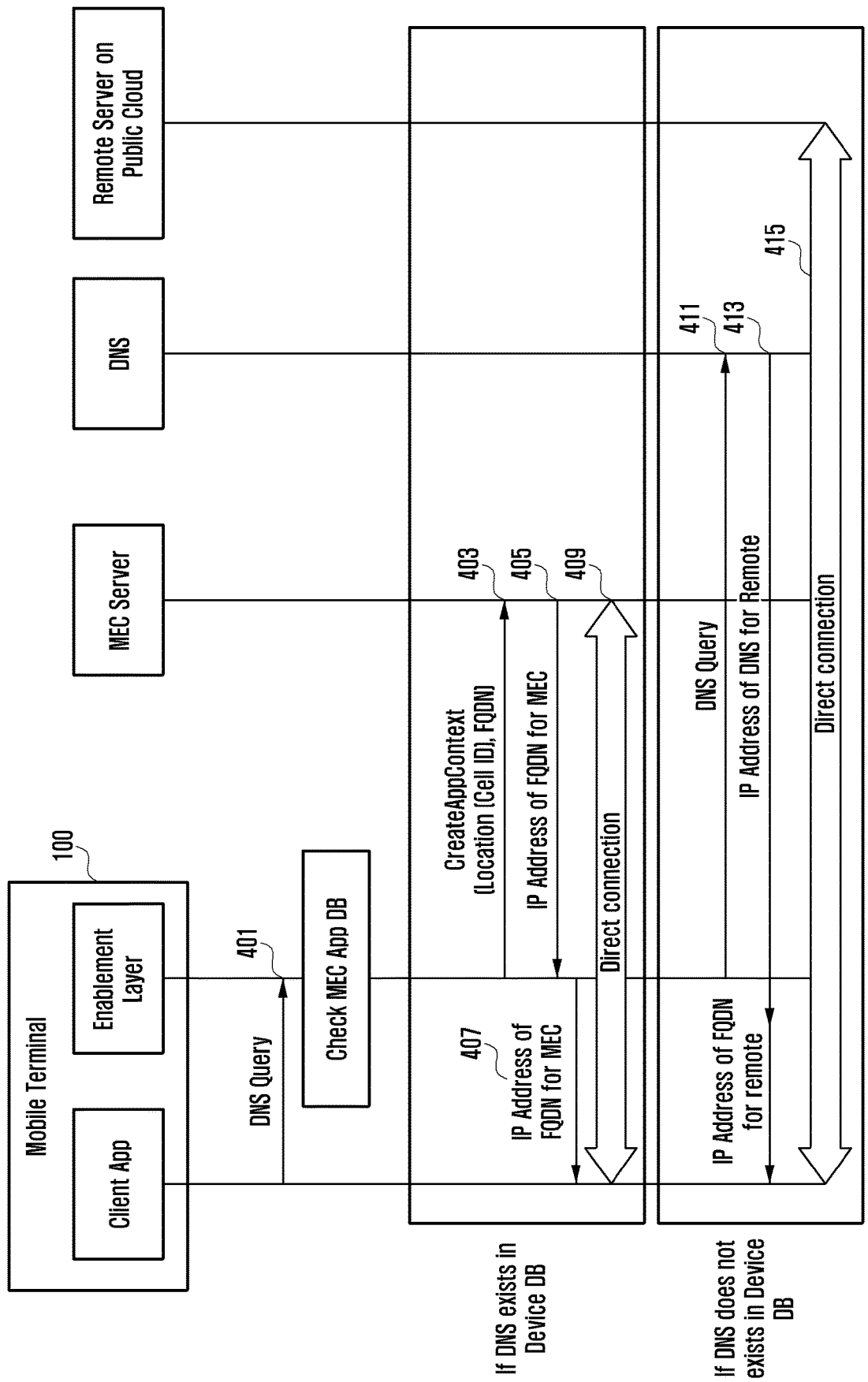

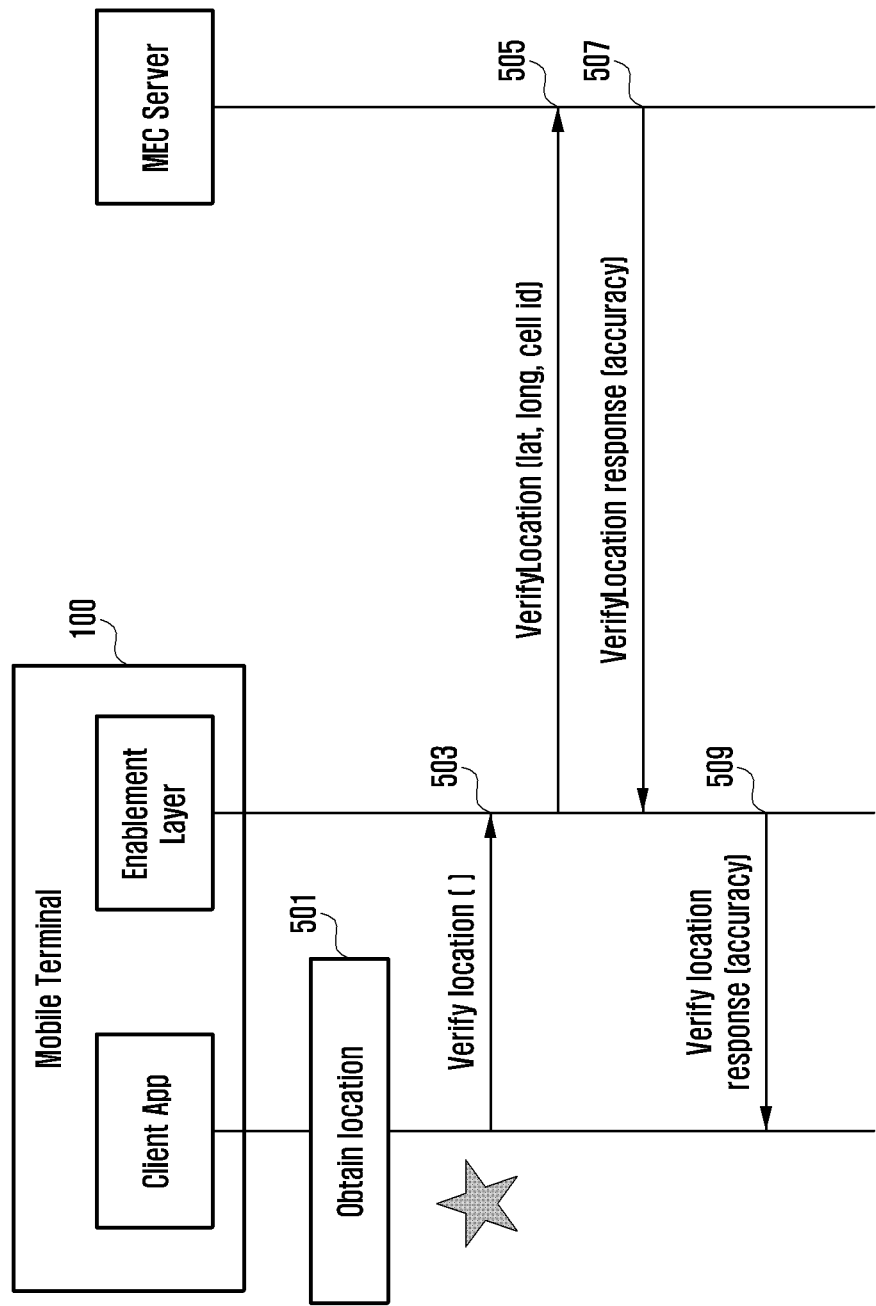

METHOD AND SYSTEM FOR DETECTING EDGE SERVER IN MOBILE TELECOMMUNICATION NETWORK

CROSS-REFERENCE TO RELATED APPLICATION(S)

This application is based on and claims priority under 35 U.S.C. § 119(a) to Indian Provisional Patent Application No. 201841037842 (PS), filed in the Indian Patent Office on Oct. 5, 2018 and to Indian Non-Provisional Patent Application No. 201841037842 (CS), filed in the Indian Patent Office on Oct. 4, 2019, the entire disclosure of each of which is incorporated herein reference.

BACKGROUND OF THE INVENTION

Field of the Invention

The present disclosure generally relates to field of telecommunication network. Particularly, but not exclusively, the present disclosure relates to a method and a system to detect an edge server in a mobile telecommunication network for efficient packet routing.

Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

In an embodiment, the present disclosure may relate to a method for detecting edge server in a mobile telecommunication network by a mobile terminal. The method comprising transmitting, by the mobile terminal, a registration request to a base station, receiving, by the mobile terminal, a registration accept response from the base station, wherein the registration accept response comprises LADN information, sending, by the mobile terminal, a Domain Name Server (DNS) query using the LADN information to a DNS operator, receiving, by the mobile terminal, an IP address of a MEC server in response to the DNS query, registering, by the mobile terminal, mobile terminal information with the MEC server using the IP address and receiving, by the mobile terminal, information on edge infrastructure availability and application server instances from the MEC server.

In an embodiment, the present disclosure may relate to a mobile terminal for detecting edge server in a mobile telecommunication network. The mobile terminal comprising a processor and a memory communicatively coupled to the processor, wherein the memory stores processor-executable instructions, which on execution, cause the processor to transmit a registration request to a base station, receive a registration accept response from the base station, wherein the registration accept response comprises LADN information, send a DNS query using the LADN information to a DNS operator, receive an IP address of a MEC server in response to the DNS query, register mobile terminal information with the MEC server using the IP address and receive information on edge infrastructure availability and application server instances from the MEC server.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

FIG. 3A and FIG. 3B illustrate sequence diagrams explaining operation of registration with edge server and service discovery by a mobile terminal in a mobile telecommunication network in accordance with some embodiments of the present disclosure.

FIG. 4 shows a sequence diagram illustrating operation of DNS resolution and packet routing in a mobile telecommunication network in accordance with some embodiments of the present disclosure.

FIG. 5 illustrates a sequence diagram explaining operation of verifying user location using MEC server in a mobile telecommunication network in accordance with some embodiments of present disclosure.

Figure 1A:
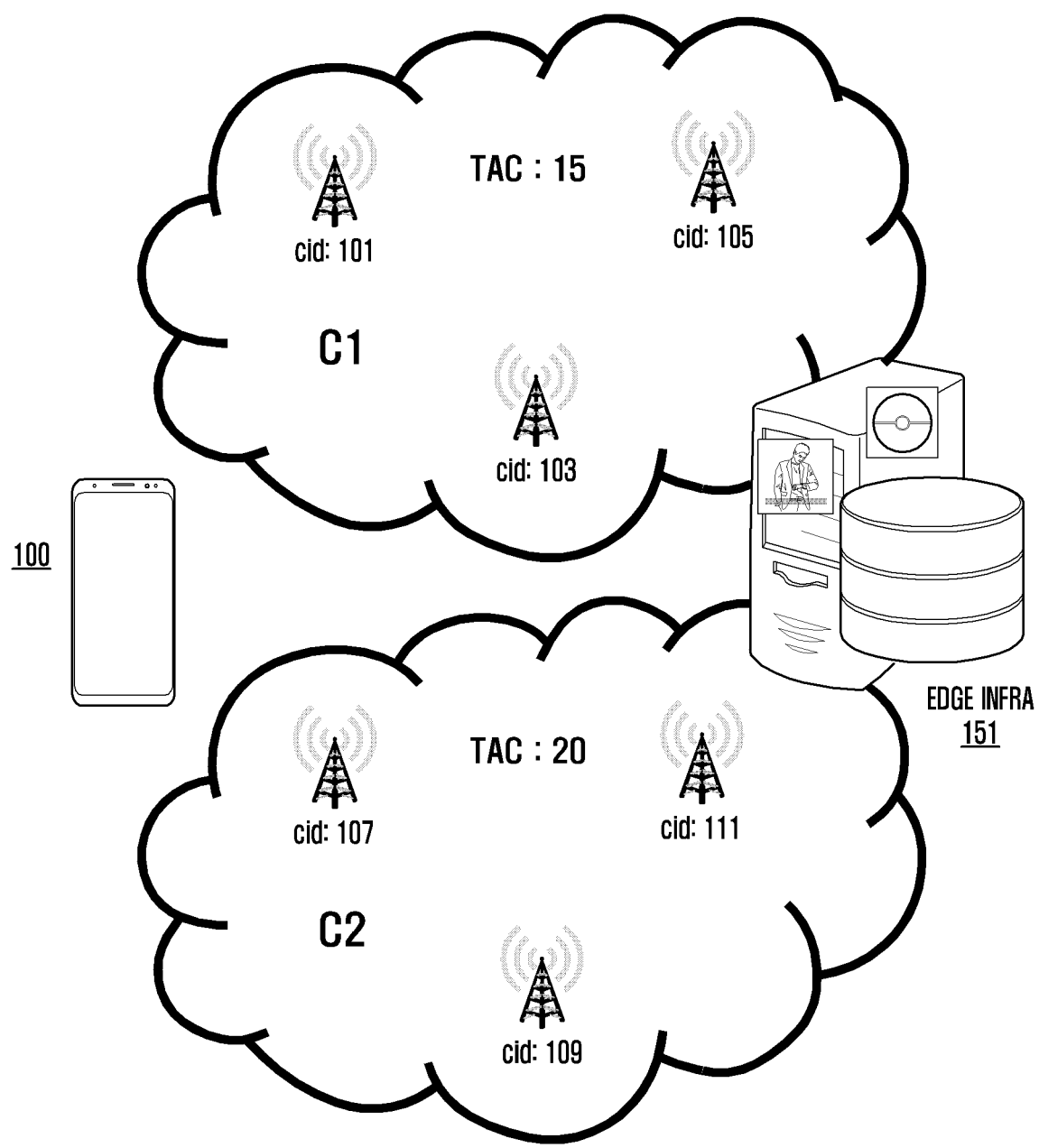
FIG. 1A and FIG. 1B illustrate an exemplary environment for tracking edge server by a mobile terminal in a mobile telecommunication network in accordance with some embodiments of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF EXEMPLARY EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Mobile Edge Computing (MEC) enables cloud computing and Information Technology (IT) service environment at the edge of the network. In MEC, by running applications and performing application-related processing tasks closer to customer network, network congestion is reduced, and applications perform better. As an example, the applications may include, but are not limited to, gaming application, applications related to virtual/augmented reality and the like. The MEC is implemented at cellular base stations or at other edge nodes and enables flexible and rapid deployment of new applications and services for customers. MEC aims to place computing and storage resources in 4G/5G Radio Access Network (RAN) to improve delivery of content and applications to end-users. The MEC technology enables operators to adapt better to the network traffic prevailing in the radio conditions, optimize service quality and improve network efficiency.

At present, to make applications agnostic to edge deployment, 3rd Generation Partnership Project (3GPP) & European Telecommunications Standards Institute (ETSI) standards have defined procedures for making User Equipment (UE) to be aware about edge availability in a geographical area and have provision to route the packets automatically to a remote server or edge cloud server. In order to make the UE aware about the edge deployed in the area, 5G registration accept may carry LADN (Local Area Data Network) information. However, in reality, not all cells of LADN would be edge deployed or edge could be deployed along with few existing 4G RAN. Even if edge is deployed for a particular application, due to resource restriction, some users may be pushed out of edge services temporarily. Hence, those application may have to connect to remote cloud automatically.

Further, in order to route the application packets to either edge or remote cloud, 3GPP has defined few mechanisms as described below.

Usage of Uplink Classifier (UL CL) functionality for a Protocol Data Unit (PDU) session. In this approach, the UL CL applies filtering rules (for example, to examine the destination Internet Protocol (IP) address of IP packets sent by the UE) and determines how the packet should be routed. The drawback of this mechanism is that the UE uses the same IP address to access the network and is not aware with which Data Network (DN) it is communicating with.

Usage of an Internet Protocol version 6 (IPv6) multi-homing for a PDU session. In this approach, a given PDU session is associated with multiple IPv6 prefixes. A "common" user plane function referred to as "branching point" is responsible for steering the UL traffic towards one or the other IP anchor based on the source prefix of the packet. The branching point for a given PDU session may be inserted or removed by the Session Management Control Function (SMF) dynamically. Request For Comments (RFC 4191) is used to configure rules into the UE to influence the selection of the source address.

Support for LADN. In this approach, the UE explicitly requests a PDU session to a special Access Point Network/Digital Data Network (APN/DDN) in order to get access to the locally provided service. To support this, the Access and Mobility Management Function (AMF) provides to the UE the LADN information about the LADN availability. The AMF tracks the UE and informs the SMF whether the UE is in the LADN service area. LADN information is provided to the UE by the AMF during registration. This information consists of LADN DNN and LADN service area information. The UE may then request a PDU session establishment for an available LADN when the UE is located in the LADN service area.

In addition to 3GPP mechanisms illustrated above, at RAN level, network can implement deep packet inspection to route the packets. However, it is a costly operation and may not be a feasible solution when deployed at a large scale. All of the 3GPP mentioned mechanisms are mainly considered to be deployed later i.e. after 5G network launch. But with the existing 4G network or initial 5G launch, UE side implementation of routing packets to appropriate cloud needs to be taken care at the device side itself.

Embodiments of the present disclosure relate to a method and a system for edge server in a mobile telecommunication network by a mobile terminal. Typically, MEC server aims to compute and place storage resources in the 4G/5G radio access network to improve the delivery of content and applications to end-users. Applications may include self-driving, gaming, virtual/augmented reality, remote tele-surgery, etc. However, with the existing 4G network or initial 5G launch, user equipment side implementation of routing packets to appropriate MEC server needs to be taken care at the device side itself. The present disclosure provides a method that detects the deployment of MEC server by way of polling for edge at geographical area change or periodically, and route application layer packets to remote server or edge server, based on whether application server resides in remote server or edge server. The present disclosure provides an efficient mechanism for routing data packets in telecommunication network based on determining whether application server resides in remote server or edge server.

Figure 1B:
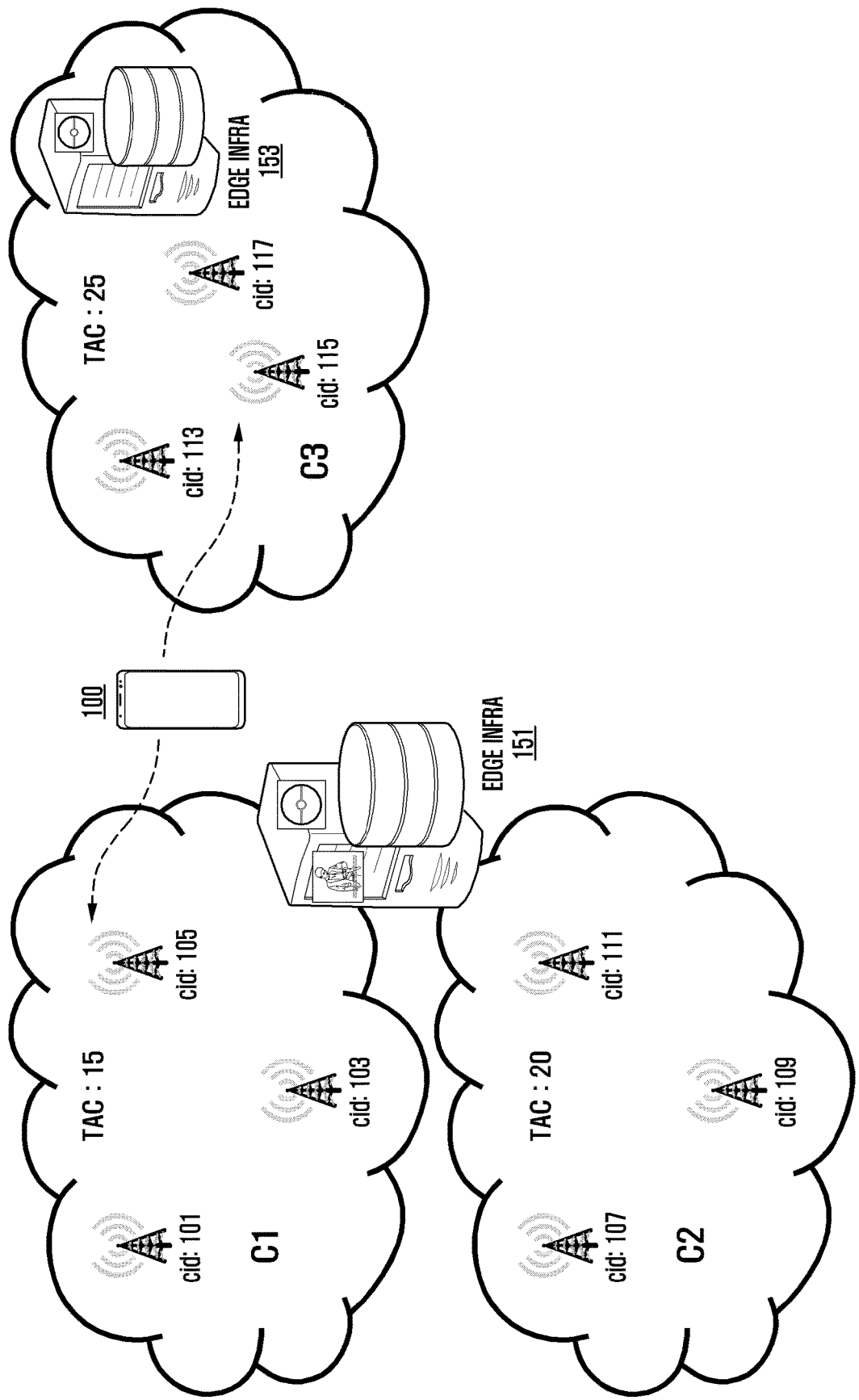

FIG. 1A and FIG. 1B illustrate an exemplary environment for tracking edge server by a mobile terminal in a mobile telecommunication network in accordance with some embodiments of the present disclosure.

As shown in the FIG. 1A, the environment includes a mobile terminal 100, an edge Infra 151 and a plurality of base stations 101, 103, 105, 107, 109 and 111. The mobile terminal 100 may, also, be referred as a terminal, a mobile or a user equipment. Here, the edge Infra (also, referred as edge Infrastructure) 151 may refer to an edge serve or a MEC server or an LCM proxy or an edge Service Provider (ESP). The edge Infra host application server instances using private IP addresses, which are not accessible globally whereas DNS servers (not shown in FIG. 1A) provide public IP addresses for application server and cannot provide the nearest server instance such as the edge Infra. The base station may be an evolved Node B (eNodeB) for 4G cellular network or a Next Generation Node B (gNodeB) for 5G cellular network or a base station supporting 2G and/or 3G technology. The base stations 101, 103 and 105 form a Tracking Area (TA). TA is basically a geographical combination of several base stations (eNodeBs or gNodeBs). TA may be uniquely identified by a code called a Tracking Area Code (TAC). The base stations 101, 103 and 105 are identified by TAC 15. The base stations 101, 103 and 105 together form a cell C1. Furthermore, the base station 100, 103 and 105 may be identified by cell identifier (cid) 101, 103 and 105, respectively. Here, in this application reference numerals of the base stations and respective cell identifiers (cid) are same. For example, the base station 101 will have cid 101. Analogously, the base stations 107, 109 and 111 are identified by TAC 20. The base stations 107, 109 and 111 together form a cell C2. Furthermore, the base station 107, 109 and 111 may be identified by cell identifier (cid) 107, 109 and 111, respectively. As shown in FIG. 1A, multiple Tracking Areas may share the same edge Infra 151. The base stations 101, 103 and 105 belonging to TAC 15 and the base stations 107, 109 and 111 belonging to TAC 20 share the same edge Infra 151. For example, the applications supported by the edge Infra 151 may include games like Pokemon Go™ and PUBG™.

With reference to the FIG. 1A, in response to "Registration Request" message from the mobile terminal 100, "Registration Accept" message is received from corresponding base station. In the "Registration Accept" message, the mobile terminal 100 will receive LADN information, which comprises LADN Access Point Name (LADN APN) and Tracking Area Code (TAC) set. For instance, the mobile terminal 100 will receive LADN APN: {vzw.liquidsky} and Tracking Area Code set, S={15, 20}. Here, 'vzw' is the operator and 'liquidsky' is the ESP. When a user with the mobile terminal 100 roams from one cell (C1) to another cell (C2), edge tracker module (to be discussed in FIG. 2) of the mobile terminal 100 checks whether the TAC of C2 i.e. 20 is present in the set S. If the TAC of C2 is present in the set S, the mobile terminal 100 continues with the previous registration details. Since in this case, the TAC set includes 20, the mobile terminal 100 continues with the previous registration details.

In brief, the method of tracking edge server by the mobile terminal comprises of checking, by the mobile terminal, TAC of an another cell is present in the TAC set of the mobile terminal when the mobile terminal moves from one cell to the another cell, and communicating, by the mobile terminal, with application server instances using existing edge service IP address and port number, when the TAC of the another cell is present in the TAC set of the mobile terminal.

As shown in the FIG. 1B, the environment includes an edge Infra 153 and a plurality of base stations 113, 115 and 117 in addition to the environment described in the FIG. 1A. Here, the edge Infra 153 may refer to an edge serve or a MEC server. In this example, the application supported by the edge Infra 153 may include Pokemon Go™. The base station may be an evolved Node B (eNodeB) for 4G cellular network or a Next Generation Node B (gNodeB) for 5G cellular network or a base station supporting 2G and/or 3G technology. The base stations 113, 115 and 117 form a TA.

The base stations 113, 115 and 117 are identified by TAC 25. The base stations 113, 115 and 117 together form a cell C3. Furthermore, the base station 113, 115 and 117 may be identified by cid 113, 115 and 117, respectively.

With reference to the FIG. 1B, when the user with the mobile terminal 100 roams from one cell (C1) to another cell (C3), the edge tracker module of the mobile terminal 100 checks whether the Tracking Area Code of C3 i.e. 25 is present in the set S. If the TAC of C3 is not present in the set S, the edge Tracker of the mobile terminal 100 has to re-register with the ESP. As shown in FIG. 1B, the current TAC is 25, which is not present in TAC set S={15, 20}, hence, the edge Tracker of the mobile terminal 100 re-registers the mobile terminal 100 with the ESP for the usage of new resource edge Infra 153.

In brief, the method of tracking edge server by the mobile terminal comprises of re-registering, by the mobile terminal, the mobile terminal information with the MEC server using the IP address when the TAC of the another cell is not present in the TAC set of the mobile terminal.

Figure 2:
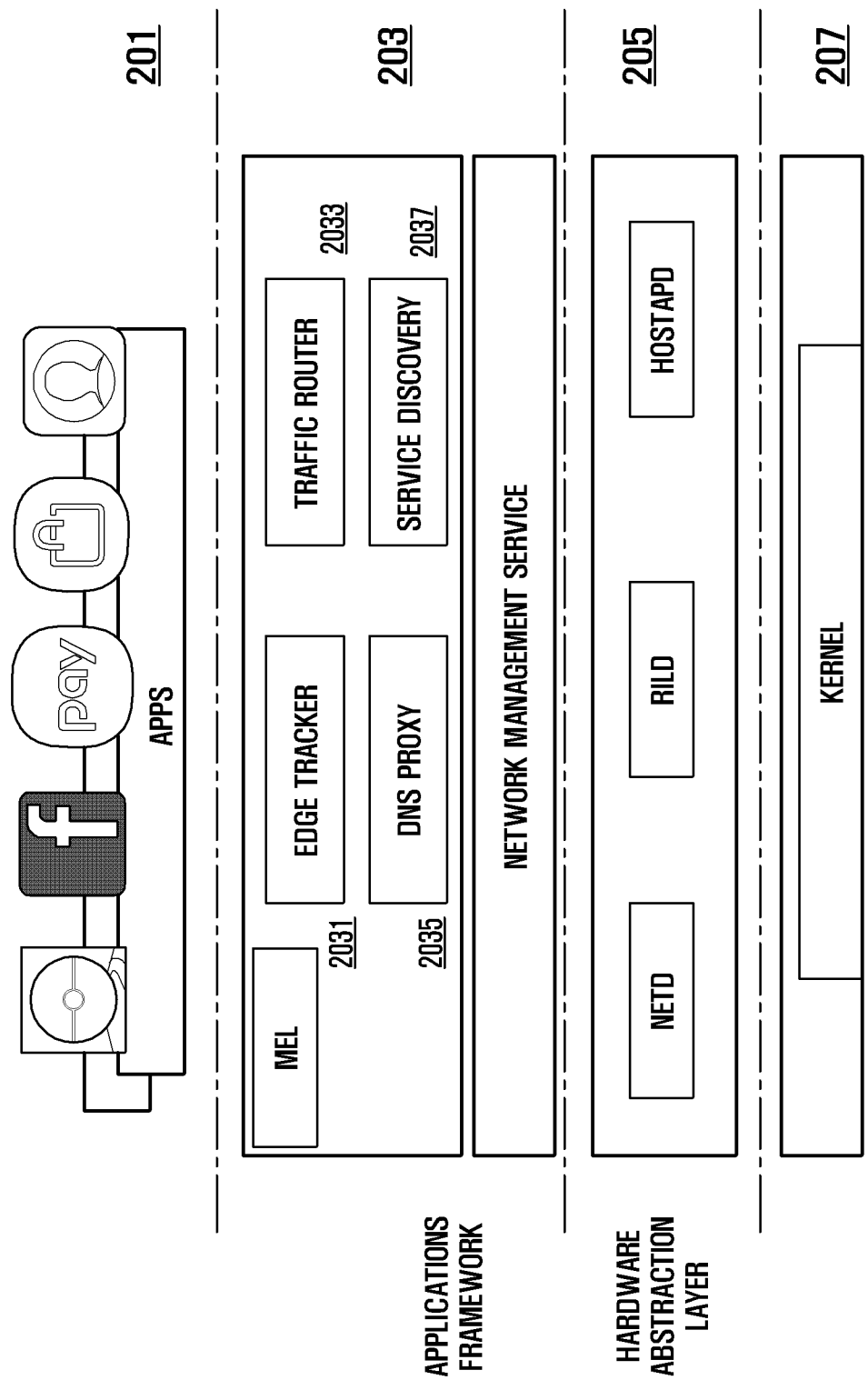
FIG. 2 shows a block diagram of an architecture of mobile enablement layer in a mobile terminal in accordance with some embodiments of the present disclosure.

FIG. 2 shows a block diagram of an architecture of mobile enablement layer in a mobile terminal in accordance with some embodiments of the present disclosure.

The present disclosure uses a mobile terminal 100 that supports any existing and upcoming telecommunication technology such as 2G, 3G, 4G and 5G technology. Here, the mobile terminal 100 may, also, be referred as a terminal, a mobile or a user equipment. The typical features of a mobile terminal, for instance, an I/O interface, a display, one or more processors and one or more memories are not described here. In addition to the typical features of the mobile terminal 100, the mobile terminal 100 in the present disclosure comprises of a Mobile Enablement Layer (MEL) in Application Framework 203. The MEL may, also, be referred to as Enablement Layer (EL). The terms MEL and EL may be interchangeably used in the present disclosure. The MEL comprises of following modules: edge tracker 2031, Traffic router 2033, DNS proxy 2035 and Service discovery 2037. The edge tracker module 2031, on receiving "Registration Accept" response, checks the edge server availability and fetches LADN APN name along with a set of Tracking Area Codes (TACs). With the LADN APN name, the edge tracker module 2031 identifies the ESP and registers with the ESP. The Service discovery module 2037 communicates with the ESP and finds out edge Infra availability and services (application server instances) supported at the edge Infra. The applications whose server instances are available at the edge Infra are called edge-enabled applications. The Service discovery module 2037, in turn informs the Traffic router 2033 module, the details of edge-enabled applications. From here on, all DNS queries originating from the edge-enabled applications will go to the DNS proxy module 2035. The DNS proxy module 2035 receives all the DNS queries initiated by the edge-enabled applications which, in turn, contacts the ESP to find the server identity (IP address and port number). The DNS proxy module 2035 then responds the DNS queries back with the edge service IP address and port number. The Traffic router module 2033 routes the DNS requests of the edge-enabled applications to the DNS proxy module 2035. For all other applications, the DNS traffic goes directly to the operator DNS server.

In addition to MEL, the Application Framework 203 comprises of Network Management Service. The Application Framework 203 is in between Apps 201 and Hardware abstraction layer 205 as shown in the FIG. 2. The Hardware abstraction layer 207 is followed by Kernel 207. The Kernel 207 is an operating system that allows applications to communicate with hardware. Network Management Service resides in the framework of Android. It is an entity which communicates with Kernel and manages rules related to packet routing. It deals with IP Tables NATing, incoming/outgoing traffic rules. Hardware Abstraction Layer is the intermediate layer provided for communication with Kernel. Generally, this Abstraction layer has User Space APIs to interact with Kernel which runs in System or Kernel Space. Kernel is the operating system which provides all the resource management services provided by the OS on the System.

The architecture of mobile enablement layer in a mobile terminal helps the application installed in the mobile terminal to find nearest server instance without any changes in application code. Finding of the nearest server instance is irrespective of whether the server instance runs on edge infrastructure that uses private IP address or remote/cloud infrastructure that uses public IP address.

Figure 3A:
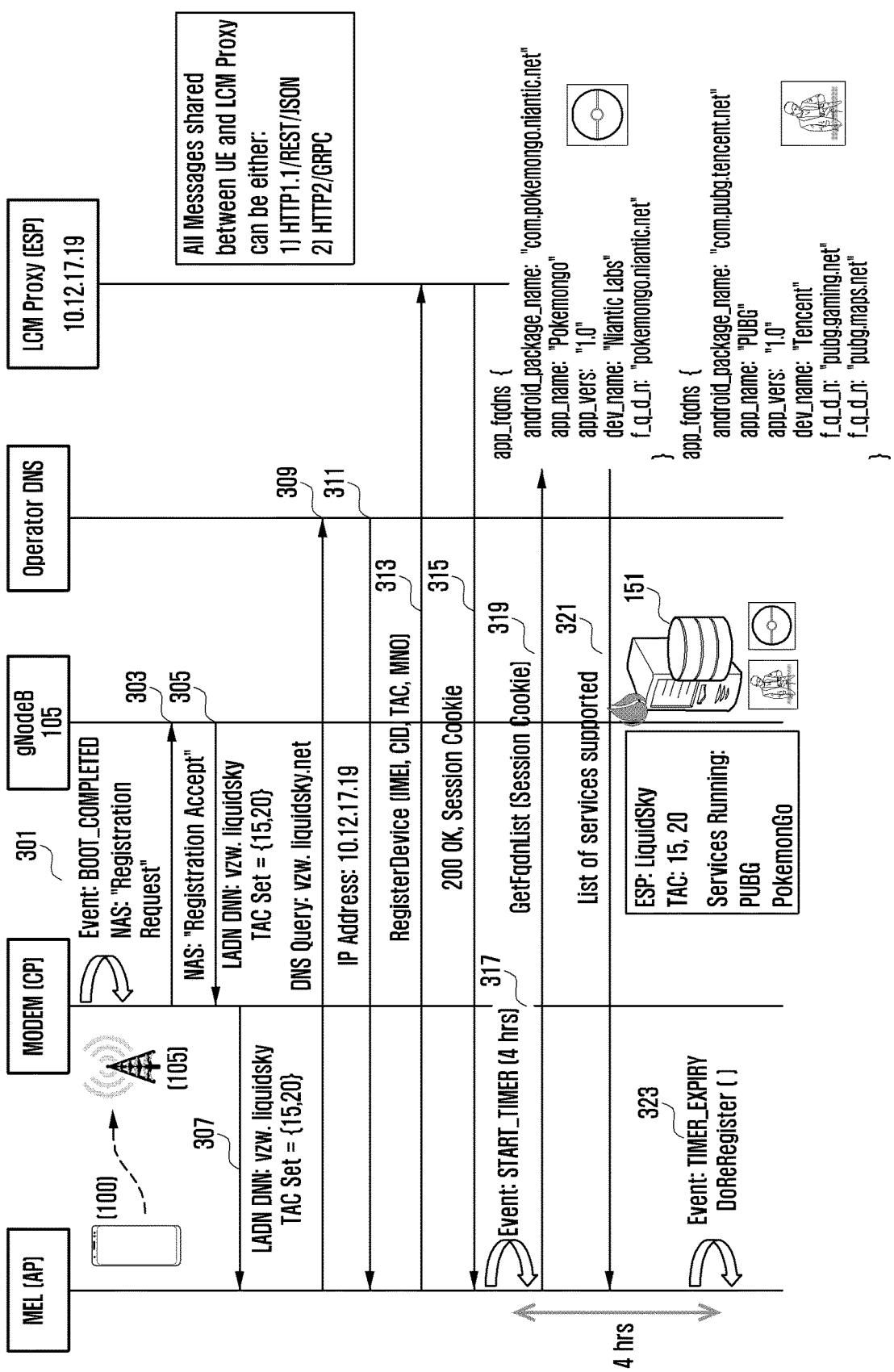

FIG. 3A and FIG. 3B illustrate sequence diagrams explaining operation of registration with edge server and service discovery by a mobile terminal in a mobile telecommunication network in accordance with some embodiments of the present disclosure.

Figure 7:
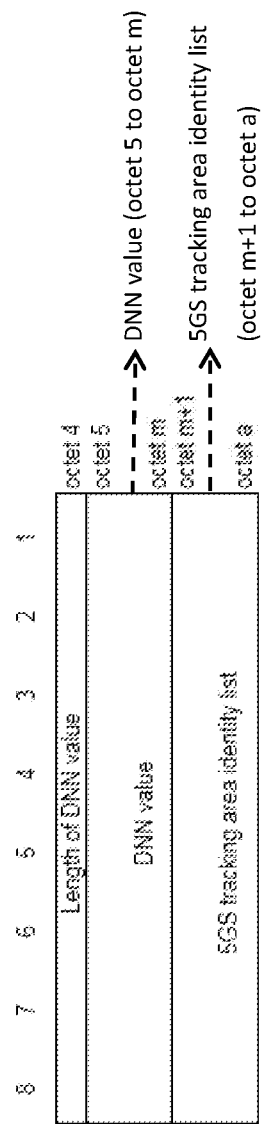
FIG. 7 illustrates LADN information provided with a "Registration Accept" message in accordance with some embodiments of the present disclosure.

With reference to the FIG. 3A, step 301 indicates the mobile terminal 100 boot completion. At step 303, a "Registration Request" message from the mobile terminal 100 is sent to corresponding base station 105, in this case, gNodeB. In response to the "Registration Request" message, the gNodeB 105 send a "Registration Accept" at step 305 to the mobile terminal 100, which in turn is sent to the MEL of the mobile terminal 100 at step 307. In the "Registration Accept" message, the mobile terminal 100 will receive LADN information, which comprises LADN APN and TAC set. For example, in this case, the mobile terminal 100 receives LADN APN: {vzw.liquidsky} and TAC set={15, 20}. Here, VZW is the operator and liquidsky is the ESP. The LADN information provided with the "Registration Accept" message is illustrated in FIG. 7.

Here, the operator shall provide the Data Network Name (DNN). The DNN is typically in the form of an APN. The operator shall provide the DNN name as vzw.liquidsky, which means 'vzw' is the operator and 'liquidsky' is the ESP. Similarly, for example, att.akraino specifies that 'att' is the operator and 'akraino' is the ESP. The mobile terminal 100 shall form the domain name by adding .net to LADN name in order to get (address) of ESP.

At step 309, using the LADN APN, the MEL of the mobile terminal 100 sends a DNS query to an operator DNS server. At step 311, the MEL of the mobile terminal 100 receives an IP address of ESP from the operator DNS server. Using the IP address, at step 313, the MEL of the mobile terminal 100 registers the mobile terminal 100 details with the ESP. The mobile terminal 100 details comprise of International Mobile Equipment Identity (IMEI), cell identifier (cid), TAC and mobile network operator (MNO). At step 315, the ESP send an acknowledgement for registration to the MEL of the mobile terminal 100. At step 317, the MEL of the mobile terminal 100 starts a timer. At step 319, the MEL of the mobile terminal 100 send a request for getting Fully Qualified Domain Name (FQDN) list of application servers. In response to the request, the ESP sends a list of services/applications supported by MEC server at step 321. At step 323, the timer stops after the time expires.

In brief, the operation of registration with edge server and service discovery by the mobile terminal 100 comprises of transmitting, by the mobile terminal, a registration request to a base station, receiving, by the mobile terminal, a registration accept response from the base station, wherein the registration accept response comprises LADN information, sending, by the mobile terminal, a DNS query using the LADN information to a DNS operator, receiving, by the mobile terminal, an IP address of a MEC server in response to the DNS query, registering, by the mobile terminal, mobile terminal information with the MEC server using the IP address; and receiving, by the mobile terminal, information on edge infrastructure availability and application server instances from the MEC server.

With reference to the FIG. 3B, step 325 indicates the mobile terminal 100 roaming from one cell to another cell and receiving current TAC at step 327. In this case, the current TAC is 25, which is different from the existing TAC set={15, 20} present in the mobile terminal 100. Since the current TAC is not present in the existing TAC set, the MEL of the mobile terminal 100 re-registers the mobile terminal 100 details with the ESP at step 329. The mobile terminal 100 details comprise of IMEI, cid, TAC and MNO. At step 331, the ESP send an acknowledgement for registration to the MEL of the mobile terminal 100. At step 333 the MEL of the mobile terminal 100 starts a timer. At step 335, the MEL of the mobile terminal 100 send a request (GetFqdn-List) for getting new FQDN list. In response to the request, the ESP sends a list of services/applications supported by MEC server at step 337. At step 339, the timer stops after the time expires.

The message format of GetFqdnList is shown below:

```
app_fqdns {
    android_package_name: "com.pokemongo.niantic.net"
    app_name: "Pokemongo"
    app_vers: "1.0"
    dev_name: "Niantic Labs"
    f_q_d_n: "pokemongo.niantic.net"
}
app_fqdns {
    android_package_name: "com.pubg.tencent.net"
    app_name: "PUBG"
    app_vers: "1.0"
    dev_name: "Tencent"
    f_q_d_n: "pubg.gaming.net"
    f_q_d_n: "pubg.maps.net"
}
```

The above result specifies that there are 2 application supported at the edge server: Pokemon Go™ and PUBG™. The parameters within GetFqdnList message are as follows:

android_package_name: Specifies the unique package name used for Android specific platforms. This will be used to notify the user about the presence of edge for a particular application or service.

app_name: User readable Application name.

app_vers: Application version of the app.

dev_name: Specifies the developer name of the application (usually, the company which develops the application).

f_q_d_n: Fully Qualified Domain Name used to uniquely identify the service of an application. Examples include gaming logic, payment gateways, ad-sense, news pull/push, etc.

In an embodiment, IP address of the ESP may be preconfigured the MEL of the mobile terminal 100 or pushed to the MEL of the mobile terminal 100 by a DNS operator. The MEL configured in the mobile terminal 100 may take care of subscription validation on behalf of all the applications deployed/installed on the MEC server. Once the mobile terminal 100 is registered with the MEC server, the MEL of the mobile terminal 100 may check for applications deployed/installed on the MEC server periodically (say once in 2 or 4 or 6 hrs) or/and at every cell change. Thereafter, a notification is provided to all the applications which supports edge. The list of application which supports edge is stored locally in the mobile terminal 100.

In brief, the operation of registration with edge server and service discovery by the mobile terminal 100 further comprises of receiving, by the mobile terminal, new information on the edge infrastructure availability and the application server instances from the MEC server at a pre-defined interval of time or at every cell change, and updating, by the mobile terminal, the edge infrastructure availability and the application server instances with the new information in the internal memory of the mobile terminal.

In an embodiment, services level granularity for the same application may be achieved using different FQDN's for different services. For instance, different modules of the application server may be running on different locations. For example, gaming logic of the PUBG™ gaming application, which is latency sensitive, may be placed in the edge server (closer to the user) whereas the advertisement content, which are not latency sensitive, may come from a remote server. The services level granularity is achieved using the FQDN logic explained earlier in FIG. 3A and FIG. 3B.

Figure 3C:
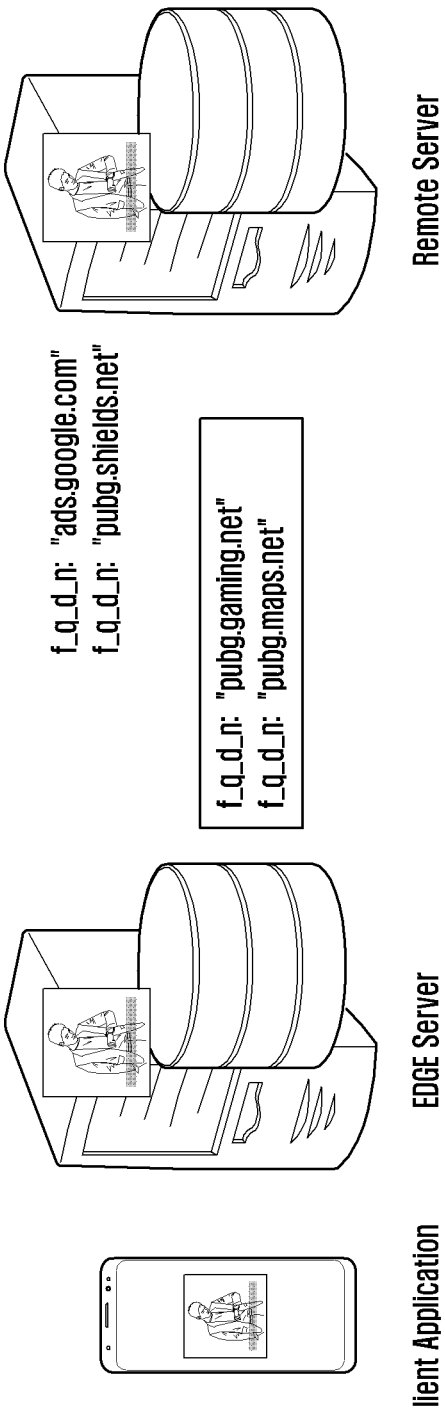
FIG. 3C illustrates service level granularity in a mobile telecommunication network in accordance with some embodiments of the present disclosure.

With reference to the FIG. 3C, consider the following case of PUBG™ game. The client configuration or application shows 4 FQDNs are used by PUBG™ app. The edge server configuration of the same application server serves only 2 FQDNs, which means that the gaming logic and the maps used in the game are latency sensitive and kept closer (in the edge server) whereas the rarely used information such as advertisements (i.e. ads) will come from the remote server.

FIG. 4 shows a sequence diagram illustrating operation of DNS resolution and packet routing in a mobile telecommunication network in accordance with some embodiments of the present disclosure.

In an embodiment, a DNS query is triggered by an application (also, referred as an App) installed in the mobile terminal 100 at the launch of the application at step 401. The EL of the mobile terminal 100 detects the DNS query based on destination port set as 53, which may be a fixed destination port. Further, the EL of the mobile terminal 100 checks from the DNS query check if the respective application is deployed/installed on MEC server using MEC application database (App DB) built locally in the mobile terminal 100. In an embodiment, if the application is found to be in the MEC App DB, which indicates the presence of the application on the MEC server, then the following steps are performed:

At step 403, the EL of the mobile terminal 100 connects the MEC server to create or initiate application context (Create App Context). In doing so, location information, cell id and FQDN are sent to the MEC server.

At step 405, the MEC server sends an IP address of the FQDN or the application server hosted on the MEC server. The EL of the mobile terminal 100 receives the IP address. The same IP address is notified to the client application by the EL of the mobile terminal 100 at step 407.

At step 409, data session or communication is established between the client application and application server hosted on the MEC server.

In brief, the operation of DNS resolution and packet routing in a mobile telecommunication network comprises checking, by the mobile terminal 100, whether the edge-enabled applications is installed on the application server instances based on the DNS query triggered by the edge-enabled application and the information stored in the internal memory of the mobile terminal 100. If the edge-enabled application is installed on the application server instances, transmitting, by the mobile terminal 100, DNS query initiated by edge-enabled application in the mobile terminal 100 to the MEC server for finding edge service IP address and port number and receiving, by the mobile terminal 100, the edge service IP address and port number for the DNS query initiated by edge-enabled application in the mobile terminal 100.

In an embodiment, if the application is not found to be in the MEC APP DB, which indicates the absence of the application on the MEC server, then the following steps are performed:

At step 411, the EL of the mobile terminal 100 routes the DNS query to a remote DNS server.

At step 413, the remote DNS server sends an IP address of a remote server on a public cloud. The EL of the mobile terminal 100 receives the IP address. The same IP address is notified to the client application by the EL of the mobile terminal 100.

At step 415, data session or communication is established between the client application and the remote server on a public cloud.

In brief, if the edge-enabled application is not installed on the application server instances, transmitting, by the mobile terminal 100, DNS query initiated by edge-enabled applications in the terminal 100 to the DNS operator; and receiving, by the mobile terminal 100, IP address and port number of a remote server on a public cloud.

FIG. 5 illustrates a sequence diagram explaining operation of verifying user location using MEC server in a mobile telecommunication network in accordance with some embodiments of present disclosure.

In an embodiment, some applications may wish to ensure mobile terminals that use a particular application are in specific geographical areas. For example, the specific geographical areas may include a particular cell, a particular city, a particular country or a particular region. There are applications which may send wrong geographical information to their respective servers. For example, an application may send wrong Global Positioning System (GPS) co-ordinates or cell identifier to gain illegal access. Hence, application servers demand a legal way of verifying user location. The MEC server being deployed close to Radio Access Network (RAN) can be used to verify user location and give server access to valid users only. This Application Program Interface (API) usage may be provided to all application irrespective of being deployed/installed on the edge server or not. The EL of the mobile terminal 100 provides generic API interface to verify location.

At first, client application installed in the mobile terminal 100 obtains location information at step 501. At step 503, the client application sends "Verify location" request to the EL. The EL of the mobile terminal 100 send the "Verify location" request to MEC server at step 505. The location information may comprise of latitude, longitude and cell identifier (cell id) details. Thereafter, the MEC server validates the location based on techniques which includes, but is not limited to, triangulation method. The validation is based on comparison of the location information with latitude and longitude information shared by the mobile terminal 100. At step 507, the MEC server provides "Verify location" response. The "Verify location" response may comprise accuracy details based on comparison. On receiving "Verify location" response, the EL sends the "Verify location" response to the client application at step 509.

In brief, the operation of verifying user location using the MEC server comprising sending, by the mobile terminal 100, verification location request along with latitude, longitude and cell identifier information of the mobile terminal 100 to the MEC server and receiving, by the mobile terminal 100, response to the verification location request from the MEC server based on validation. The validation may be based on comparing location information of the mobile terminal 100 received from a base station and the latitude and longitude information sent by the mobile terminal.

The main applications of verifying user location are identity verification and fraud detection. For instance, payment transactions from a credit card may sometimes happen from geographically far locations. Using this location API, the user will provide cell id, geographical latitude and longitude. The MEC server will verify if the user is actually attached with the cell and also, makes sure the geographical latitude and longitude lie within the cell tower region to an acceptable accuracy of 10 m-30 m. With this API, one can make sure that the payment transactions are happening using a mobile terminal. In this case, all API calls should go over cellular network. Sometimes internal GPS can easily be spoofed by 3rd party applications. Using this API, one can make sure that the user's cellular location and geographical latitude and longitude are almost the same.

For location verification or identity verification, the response latency should be less 10 s for payment transactions. This condition can be achieved with the help of location verification server running on the MEC server.

Figure 6:
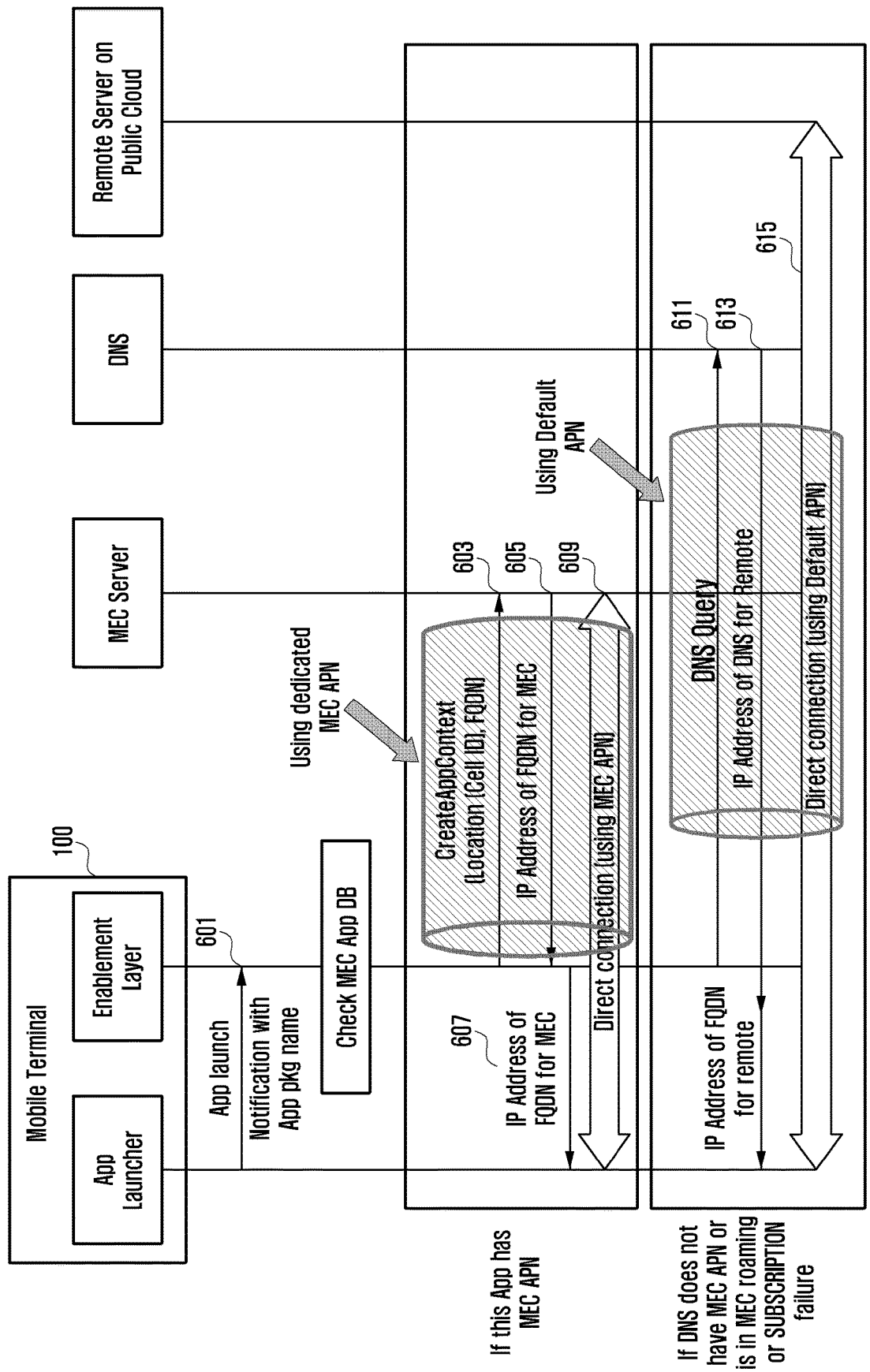
FIG. 6 shows a sequence diagram illustrating operation of Access Point Name (APN) management and packet routing in a mobile telecommunication network in accordance with some embodiments of the present disclosure.

FIG. 6 shows a sequence diagram illustrating operation of APN management and packet routing in a mobile telecommunication network in accordance with some embodiments of the present disclosure.

In an embodiment, at launch of an App, the EL of the mobile terminal 100 receives notification with the App details from the App Launcher at step 601. Here, the Application Launcher is known as Activity Manager. Activity Manager keeps track of states of all applications, like Launched, in foreground or in background. The EL of the mobile terminal 100 registers with Activity manager to receive notifications for Application Launch and its state updates. Activity manager then notifies EL of the mobile terminal 100 about the launch of the applications with their details. Here, the App is already installed in the mobile terminal 100. From the App details in the notification, the EL of the mobile terminal 100 checks if the respective App is deployed/installed on MEC server using MEC App database (App DB) built locally in the mobile terminal 100. In an embodiment, if the App is found to be in the MEC App DB, which indicates the presence of the App on the MEC server, then the following steps are performed:

At step 603, the EL of the mobile terminal 100 connects the MEC server to create or initiate application context (Create App Context). In doing so, location information, cell id and FQDN are sent to the MEC server.

At step 605, the MEC server sends an IP address of the FQDN or the application server hosted on the MEC server and APN details from APN DB, which is provided for dedicated APN routing of MEC App. The EL of the mobile terminal 100 receives the IP address along with the APN details. The same IP address and the APN details are notified to the App Launcher by the EL of the mobile terminal 100 at step 607.

At step 609, data session or communication is established between the App Launcher and application server hosted on the MEC server using the dedicated MEC APN. Here, the APN details are used for the dedicated MEC APN connection.

In brief, the management of APN and packet routing in a mobile telecommunication network comprises checking, by the mobile terminal 100, whether the edge-enabled applications is installed on the application server instances based on the DNS query triggered by the edge-enabled application and the information stored in the internal memory of the mobile terminal 100. If the edge-enabled application is installed on the application server instances, transmitting, by the mobile terminal 100, DNS query initiated by edge-enabled application in the mobile terminal 100 to the MEC server for finding edge service IP address and port number, receiving, by the mobile terminal 100, the edge service IP address and port number and APN information for the DNS query initiated by edge-enabled application in the mobile terminal 100, and establishing, by the mobile terminal 100, a data communication channel between the mobile terminal 100 and application server hosted on the MEC server using the dedicated MEC APN connection.

In an embodiment, if the App is not found to be in the MEC App DB, which indicates the absence of the application on the MEC server, then the following steps are performed:

At step 611, the EL of the mobile terminal 100 routes the DNS query to a remote DNS server.

At step 613, the remote DNS server sends an IP address of a remote server on a public cloud. The EL of the mobile terminal 100 receives the IP address. The same IP address is notified to the App Launcher by the EL of the mobile terminal 100.

At step 615, data session or communication is established between the App Launcher and the remote server on a public cloud using default APN connection. Here, data communication or application traffic is routed to default internet APN connection.

In brief, if the edge-enabled application is not installed on the application server instances, transmitting, by the mobile terminal 100, DNS query initiated by edge-enabled applications in the terminal 100 to the DNS operator, receiving, by the mobile terminal 100, IP address and port number of a remote server on a public cloud and establishing, by the mobile terminal 100, a data communication channel between the mobile terminal 100 and the remote server on a public cloud using default APN connection.

For instance, suppose PUBG™ is in edge-enabled application and Facebook is a non-MEC enabled application. In this case, PUBG™ being MEC enabled application will have its data routed using dedicated MEC APN connection whereas Facebook being non-edge-enabled application will have its data routed using default internet APN.

In an embodiment, if there is subscription failure or the mobile terminal moves out of operator MEC area, even when the applications have MEC APN, the data communication or data traffic will be routed via default internet APN. These routing decisions are facilitated by the APN management done in the EL of the mobile terminal 100.

The parameter involved in APN management for packet routing are described below:

A database consisting of all app_pkgname_params may be used for determining application identifiers (appIds), which are eligible for MEC services in current area. The same parameter may be used for managing application data traffic.

A parameter (param_network_subscription_curarea) may be used for checking for eligibility of the mobile terminal 100 by subscription purchase for MEC services. This may be, also, used for subscription management and may be taken into account when edge-enabled applications are routed via dedicated MEC APN connection.

A parameter (param_roaming_mec) may be used for checking movement in-and-out of MEC coverage area that needs to be tracked for APN management.

Some of the advantages of the present disclosure are listed below.

The present disclosure provides an efficient mechanism for routing data packets in the telecommunication network based on determining whether application server resides in remote server or edge server.

The present disclosure enables to detect edge server availability for applications and provides seamless continuity for the applications connected to the edge server during mobility of a terminal.

The present disclosure provides a secure way of verifying user location, thereby, providing server access to valid users.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3A, 3B, 4, 5 and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for detecting an edge server in a mobile telecommunication network by a mobile terminal, the method comprising:
    transmitting, by the mobile terminal, a registration request to a base station;
    receiving, by the mobile terminal, a registration accept response from the base station, wherein the registration accept response comprises Local Area Data Network (LADN) information;
    sending, by the mobile terminal, a Domain Name Server (DNS) query using the LADN information to a DNS operator;
    receiving, by the mobile terminal, an Internet Protocol (IP) address of a Mobile Edge Computing (MEC) server in response to the DNS query;
    registering, by the mobile terminal, mobile terminal information with the MEC server using the IP address; and
    receiving, by the mobile terminal, information on edge infrastructure availability and application server instances from the MEC server.

2. The method as claimed in claim 1, wherein the LADN information comprises at least one of LADN Access Point Name (LADN APN) and tracking area code (TAC) set.

3. The method as claimed in claim 1, further comprising:
    checking, by the mobile terminal, TAC of an another cell is present in the TAC set of the mobile terminal when the mobile terminal moves from one cell to the another cell;
    communicating, by the mobile terminal, with the application server instances using an existing edge service IP address and port number, when the TAC of the another cell is present in the TAC set of the mobile terminal; and
    re-registering, by the mobile terminal, the mobile terminal information with the MEC server using the IP address when the TAC of the another cell is not present in the TAC set of the mobile terminal.

4. The method as claimed in claim 1, further comprising:
    sending, by the mobile terminal, verification location request along with latitude and longitude information of the mobile terminal to the MEC server; and
    receiving, by the mobile terminal, response to the verification location request from the MEC server based on validation, wherein the validation is based on comparing location information of the mobile terminal received from the base station and the latitude and longitude information sent by the mobile terminal.

5. The method as claimed in claim 1, further comprising:
    storing, by the mobile terminal, the information on edge infrastructure availability and application server instances in an internal memory of the mobile terminal.

6. The method as claimed in claim 5, further comprising:
    receiving, by the mobile terminal, new information on the edge infrastructure availability and the application server instances from the MEC server at a pre-defined interval of time or at every cell change; and
    updating, by the mobile terminal, the stored edge infrastructure availability and the application server instances with the new information in the internal memory of the mobile terminal.

7. The method as claimed in claim 5, further comprising:
    receiving, by the mobile terminal, DNS query triggered by edge-enabled application in the mobile terminal;
    checking, by the mobile terminal, whether the edge-enabled application is installed on the application server instances based on the DNS query triggered by the edge-enabled application and the information stored in the internal memory of the mobile terminal;
    if the edge-enabled application is installed on the application server instances,
        transmitting, by the mobile terminal, DNS query initiated by edge-enabled application in the mobile terminal to the MEC server for finding edge service IP address and port number; and
        receiving, by the mobile terminal, the edge service IP address and port number for the DNS query initiated by edge-enabled application in the mobile terminal; and
    if the edge-enabled application is not installed on the application server instances,
        transmitting, by the mobile terminal, DNS query initiated by edge-enabled applications in the terminal to the DNS operator; and
        receiving, by the mobile terminal, IP address and port number of a remote server on a public cloud.

8. The method as claimed in claim 5, further comprising:
    receiving, by the mobile terminal, DNS query triggered by an edge-enabled application in the mobile terminal;
    checking, by the mobile terminal, whether the edge-enabled application is installed on the application server instances based on the DNS query triggered by the edge-enabled application and the information stored in the internal memory of the mobile terminal;
    if the edge-enabled application is installed on the application server instances, transmitting, by the mobile terminal, DNS query initiated by edge-enabled application in the mobile terminal to the MEC server for finding edge service IP address and port number;
receiving, by the mobile terminal, the edge service IP address and port number and Access Point Name (APN) information for the DNS query initiated by edge-enabled application in the mobile terminal; and
establishing, by the mobile terminal, a data communication channel between the mobile terminal and the application server instances using dedicated MEC APN connection; and
if the edge-enabled application is not installed on the application server instances,
transmitting, by the mobile terminal, DNS query initiated by edge-enabled applications in the terminal to the DNS operator;
receiving, by the mobile terminal, IP address and port number of a remote server on a public cloud; and
establishing, by the mobile terminal, a data communication channel between the mobile terminal and the remote server on a public cloud using default APN connection.

9. A mobile terminal for detecting an edge server in a mobile telecommunication network, the mobile terminal comprising:
a processor; and
a memory communicatively coupled to the processor, wherein the memory stores processor-executable instructions, which on execution, cause the processor to:
transmit a registration request to a base station;
receive a registration accept response from the base station, wherein the registration accept response comprises Local Area Data Network (LADN) information;
send a Domain Name Server (DNS) query using the LADN information to a DNS operator;
receive an Internet Protocol (IP) address of a Mobile Edge Computing (MEC) server in response to the DNS query;
register mobile terminal information with the MEC server using the IP address; and
receive information on edge infrastructure availability and application server instances from the MEC server.

10. The mobile terminal as claimed in claim 9, wherein the LADN information comprises at least one of LADN Access Point Name (LADN APN) and tracking area code (TAC) set.

11. The mobile terminal as claimed in claim 9, wherein the mobile terminal causes the processor to:
check TAC of an another cell is present in the TAC set of the mobile terminal when the mobile terminal moves from one cell to the another cell;
communicate with the application server instances using existing edge service IP address and port number, when the TAC of the another cell is present in the TAC set of the mobile terminal; and
re-register the mobile terminal information with the MEC server using the IP address when the TAC of the another cell is not present in the TAC set of the mobile terminal.

12. The mobile terminal as claimed in claim 9, wherein the mobile terminal causes the processor to:
send verification location request along with latitude and longitude information of the mobile terminal to the MEC server; and
receive response to the verification location request from the MEC server based on validation,
wherein the validation is based on comparing location information of the mobile terminal received from the base station and the latitude and longitude information sent by the mobile terminal.

13. The mobile terminal as claimed in claim 9, wherein the mobile terminal causes the processor to:
store the information on edge infrastructure availability and application server instances in an internal memory of the mobile terminal.

14. The mobile terminal as claimed in claim 13, wherein the mobile terminal causes the processor to:
receive new information on the edge infrastructure availability and the application server instances from the MEC server at a pre-defined interval of time or at every cell change; and
update the stored edge infrastructure availability and the application server instances with the new information in the internal memory of the mobile terminal.

15. The mobile terminal as claimed in claim 13, wherein the mobile terminal causes the processor to:
receive DNS query triggered by edge-enabled application in the mobile terminal;
check whether the edge-enabled applications is installed on the application server instances based on the DNS query triggered by the edge-enabled application and the information stored in the internal memory of the mobile terminal;
if the edge-enabled application is installed on the application server instances,
transmit DNS query initiated by edge-enabled application in the mobile terminal to the MEC server for finding edge service IP address and port number; and
receive the edge service IP address and port number for the DNS query initiated by edge-enabled application in the mobile terminal; and
if the edge-enabled application is not installed on the application server instances,
transmit DNS query initiated by edge-enabled applications in the terminal to the DNS operator; and
receive IP address and port number of a remote server on a public cloud.

16. The mobile terminal as claimed in claim 13, wherein the mobile terminal causes the processor to:
receive DNS query triggered by edge-enabled application in the mobile terminal;
check whether the edge-enabled application is installed on the application server instances based on the DNS query triggered by the edge-enabled application and the information stored in the internal memory of the mobile terminal;
if the edge-enabled application is installed on the application server instances,
transmit the DNS query initiated by edge-enabled application in the mobile terminal to the MEC server for finding edge service IP address and port number;
receive the edge service IP address and port number and Access Point Name (APN) information for the DNS query initiated by edge-enabled application in the mobile terminal; and
establish a data communication channel between the mobile terminal and the application server instances using dedicated MEC APN connection; and
if the edge-enabled application is not installed on the application server instances, transmit the DNS query initiated by edge-enabled applications in the terminal to the DNS operator;
receive IP address and port number of a remote server on a public cloud; and
establish a data communication channel between the mobile terminal and the remote server on a public cloud using default APN connection.

\* \* \* \* \*